United States Patent [19]
Palombo et al.

[11] 4,228,396
[45] Oct. 14, 1980

[54] ELECTRONIC TACHOMETER AND COMBINED BRUSHLESS MOTOR COMMUTATION AND TACHOMETER SYSTEM

[75] Inventors: Gaston A. Palombo, Agoura; Daniel B. Jones, Thousand Oaks, both of Calif.

[73] Assignee: Dataproducts Corporation, Woodland Hills, Calif.

[21] Appl. No.: 910,126

[22] Filed: May 26, 1978

[51] Int. Cl.³ .................. G01P 3/44; G01P 13/00; H02P 3/08; H02P 6/02
[52] U.S. Cl. .................. 324/163; 318/272; 318/313; 318/463; 324/165; 324/171; 324/175; 400/583.4; 400/611
[58] Field of Search .............. 318/313, 480, 640, 138, 318/254; 324/176, 175, 163, 165, 171; 400/583.4, 611

[56] References Cited
U.S. PATENT DOCUMENTS

| | | | |
|---|---|---|---|
| 3,477,022 | 11/1969 | Le Masters | 324/171 |
| 3,603,869 | 9/1971 | Neuffer | 324/163 |
| 3,882,402 | 5/1975 | Jensen | 324/165 |
| 4,025,934 | 5/1977 | Hartmann | 324/163 |

OTHER PUBLICATIONS
R. S. Palmer and D. W. Rickert–Optical Tachometer with Switch Circuitry–IBM Tech. Disc. Bul.–vol. 16, No. 4, Sep. 1973.

*Primary Examiner*—Gerard R. Strecker

[57] ABSTRACT

An electronic tachometer utilizes a transducer, typically an optical encoder disc, connected to a movable mechanical element. The transducer produces a pair of triangular waves of fixed relative phase, each having slopes proportional to the velocity of the mechanical element. The triangular waves are differentiated and the resultant signals are sampled by gating pulses derived from the triangular waves themselves. The samples are combined to produce an output signal having a magnitude proportional to element speed and a polarity indicative of direction.

In a combined system in which the transducer is attached to the shaft of a brushless motor, another output of the same transducer is used for commutation control of the motor stator windings. This arrangement is particularly useful in a velocity servo system, in which the tachometer output is compared with a signal indicating desired motor velocity. The comparator output is used to modify the commutation control so as to produce the desired motor velocity. Position encoding also may be accomplished using the same transducer.

5 Claims, 8 Drawing Figures

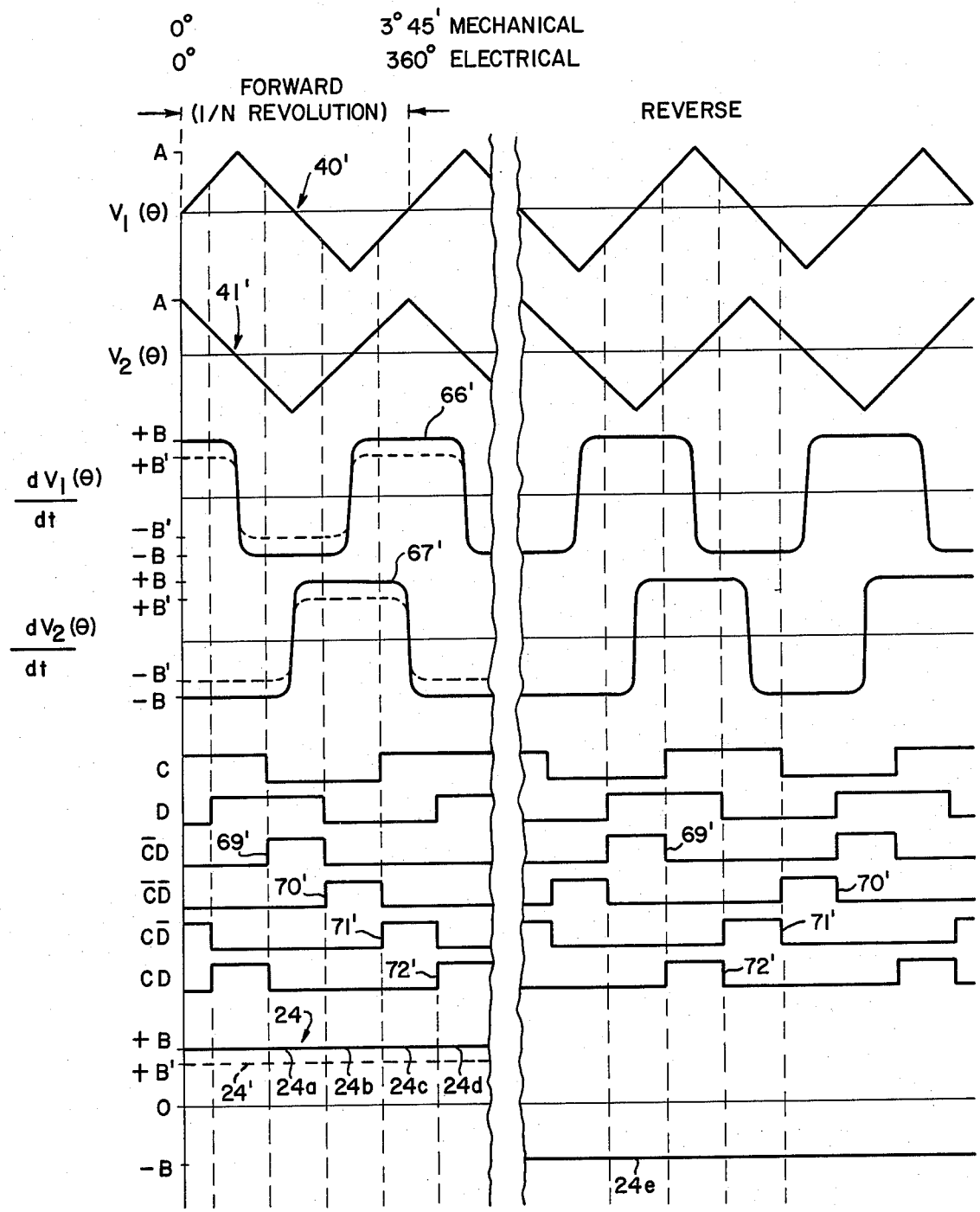

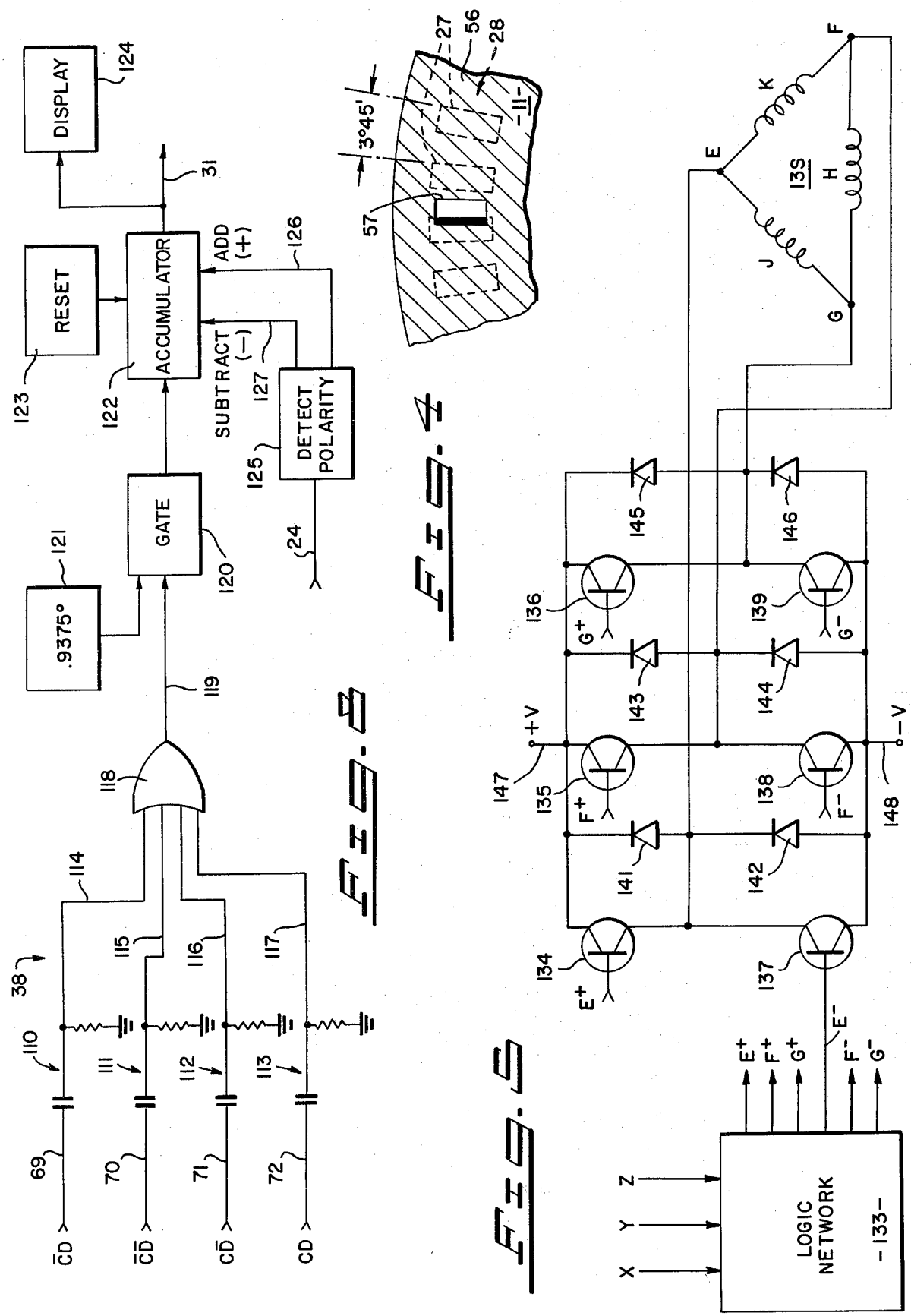

IDEALIZED TORQUE VS POSITION − 3∅, 4 POLE

ELECTRONIC TACHOMETER AND COMBINED BRUSHLESS MOTOR COMMUTATION AND TACHOMETER SYSTEM

BACKGROUND OF THE INVENTION

1. Field of the Invention

The present invention relates to an electronic tachometer and to a brushless dc motor system having combined commutation control, tachometer and position encoding functions.

2. Description of the Prior Art

In most velocity-responsive servo systems, the velocity of a mechanical element is sensed by a tachometer, the output of which is used to control the speed of a motor driving the element. A position encoder also may be used to ascertain the position of the mechanical element. Typically, such a system employs a dc motor, a separate tachometer and a separate position encoder. If a brushless motor is used, additional commutation circuitry must be used which is responsive to the angular position of the rotor.

One objective of the present invention is to provide a system to which the tachometer, position encoding and brushless dc motor communtation control functions are combined, so that independent electromechanical devices are not required to perform these functions separately. More generally, another objective is to provide an electronic tachometer for producing a signal indicative of the velocity of a mechanical element. The same transducer used by the tachometer also may be used for brushless motor commutation control and/or position encoding, and it is a further objective of the present invention to provide means for such multipurpose transducer utilization.

An example of a servo system employing these components is a medium speed printer of the type which may be used as the output device for a minicomputer. In such a printer, a paper drive mechanism is used to feed paper from a roll or zig-zag folded stack past a printing station. Typically, the paper feed motion is not continuous. Rather, the paper is held stationary while an entire line of type is printed. Then the paper quickly is advanced by one line, and stopped again for printing of the next row. A speed of 1500 lines per minute is typical for such a printer, with either six or eight lines per inch. Operating at this speed, 40 msec are available to print the entire row and to advance the paper to the next line. Obviously, the paper feed operation must be accomplished very rapidly. However, the acceleration must not be so great as to tear the paper. Moreover, the distance advanced for each line must be uniform so that the resultant document has a fixed spacing between each line.

These paper feed requirements in the past have been met by using a drive motor in a servo system employing a separate tachometer and position encoder. A velocity profile is established in which the paper initially is accelerated at a rate which will not cause tearing. When the paper moves to within a fixed distance from the next print line, as established by the output of the position encoder, deceleration begins, again with a fixed velocity profile. Throughout the operation, the motor speed is controlled by comparing the actual velocity from the tachometer with the desired velocity, the latter being indicated by a control signal which is a function of the distance travelled by the paper.

An object of the present invention is to provide an improved drive motor servo system and components therefor, which may be used advantageously in a paper feed mechanism for a printer.

Various features are desirable in the tachometer portion of such a servo system. Advantageously, the tachometer output signal should be linearly related to speed, and preferably should have a polarity which indictes the direction of motion of the mechanical element, the speed of which is being measured. Preferably, any ripples superimposed on the tachometer output signal should be of a high enough frequency to permit filtering without reducing the system bandwidth. The ripple amplitude should be independent of the output signal amplitude. There should be no motor-tachometer electromagnetic coupling and the motor-tachometer torsional resonant frequency should be as high as possible. A further object of the present invention is to provide an electronic tachometer having all of these features.

Advantageously, an electronic tachometer may employ an optical or other absolute encoder which directly indicates the motion of the mechanical element being measured. An objective of the present invention is to utilize such an encoder or transducer both as a component of an electronic tachometer and to yield commutation information for properly switching the windings of a brushless motor utilized in the system. Position encoding also may be obtained from the same transducer.

One approach utilized in the prior art to obtain both velocity and position information involves the use of an "Inductosyn". This consists of a pair of printed circuit boards each containing a comb-like pattern. The boards are mounted respectively on the moving and stationary elements of the device being measured, in transformer relationship with one another. A high frequency ac signal is fed into one of the comb-like windings, and the signal which is inductively coupled to the other winding is sensed by appropriate circuitry. As the two comb-like windings are moved relative to one another, the induced signal is demodulated and appropriately processed to obtain velocity and position information. An objective of the present invention is to provide means for obtaining velocity and position information without the requirement of using relatively movable, inductively coupled transducer components.

Another shortcoming of the prior art which is overcome by the present invention concerns commutation in a brushless dc motor. In the past, switching has been controlled by transducers using mechanical interruption of an optical beam, or by Hall-effect devices that are switched by passage of the permanent magnet rotor poles or by a separate magnetic encoder. An objective of the present invention is to provide commutation control utilizing a simplified optical transducer that may also be used in conjunction with an electronic tachometer and/or a position encoder.

SUMMARY OF THE INVENTION

These and other objectives are achieved by providing an electronic tachometer, useful per se, and a combined tachometer, brushless dc motor commutator and position encoder system.

In a preferred embodiment, the electronic tachometer employs a transducer, typically an optical encoder, which produces a pair of triangular wave signals of the same period but offset in phase with respect to each other by a fixed angular amount. The period of these signals is directly proportional to the velocity of the mechanical element to which the transducer is attached. A pair of differentiator circuits receive these triangular wave signals and produce corresponding outputs which are indicative respectively of the first time derivative of the two triangular wave signals.

Gating circuitry derives from the two triangular wave signals a set of time sequential sampling signals. These are used to sample the outputs of the differentiator circuits. The resultant sampled differentiator output signals are sequentially combined on a common line to provide the tachometer output signal. This tachometer output has an amplitude directly proportional to the speed of the moving mechanical element being measured, and has a polarity which indicates the direction of motion.

Each cycle of each triangular wave obtained from the tachometer transducer indicates that the associated mechanical element has moved through a fixed distance. Thus the same signal may be used to determine the position of the element being measured. In one embodiment, the number of such cycles may be counted and multiplied by the distance travelled to produce one such cycle. The product indicates the total distance travelled.

Commutation control for a brushless motor may be achieved using the same optical or other transducer used in conjunction with the tachometer. In a preferred embodiment, the transducer comprises an optical encoder coupled to the shaft of the brushless motor. The encoder position thus indicates the orientation of the rotor magnets. Appropriate circuitry may be used to switch power to the stator windings so as to achieve motor rotation in the desired direction. Such commutation may be combined with pulse width modulation or other known control techniques to accomplish motor speed control.

In a servo system, the electronic tachometer and commutation functions may be used cooperatively to accomplish motor speed and direction control in response to an input signal indicative of the desired velocity. To this end, the tachometer output, indicative of actual motor velocity, may be compared with the desired velocity-indicating signal so as to derive a motor control signal. This control signal then may be used in conjunction with the commutation circuitry so as to speed up, slow down or change the direction of the motor until its velocity corresponds to the desired value. In applications in which a desired velocity profile as a function of position is required, such as in a paper feed mechanism, position encoding may be used to provide the requisite position indicating signal for utilization by the servo system.

BRIEF DESCRIPTION OF THE DRAWINGS

A detailed description of the invention will be made with reference to the accompanying drawings, wherein like numerals indicate corresponding elements in the several figures.

FIG. 3 is a set of wave forms illustrating the operation of the tachometer circuit of FIG. 2.

FIG. 4 is a fragmentary diagrammatic view of an optical mask arrangement useful with the encoder disc of FIG. 1.

FIG. 5 is an electrical schematic diagram of commutation circuitry for driving the stator windings of the brushless motor in accordance with the rotor magnet orientation as detected by the optical encoder of FIG. 1.

FIG. 8 is an electrical block diagram of a position encoder utilizing the optical transducer of FIG. 1.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention best is defined by the appended claims.

Operational characteristics attributed to forms of the invention first described also shall be attributed to forms later described, unless such characteristics obviously are inapplicable or unless specific exception is made.

Figure 1:
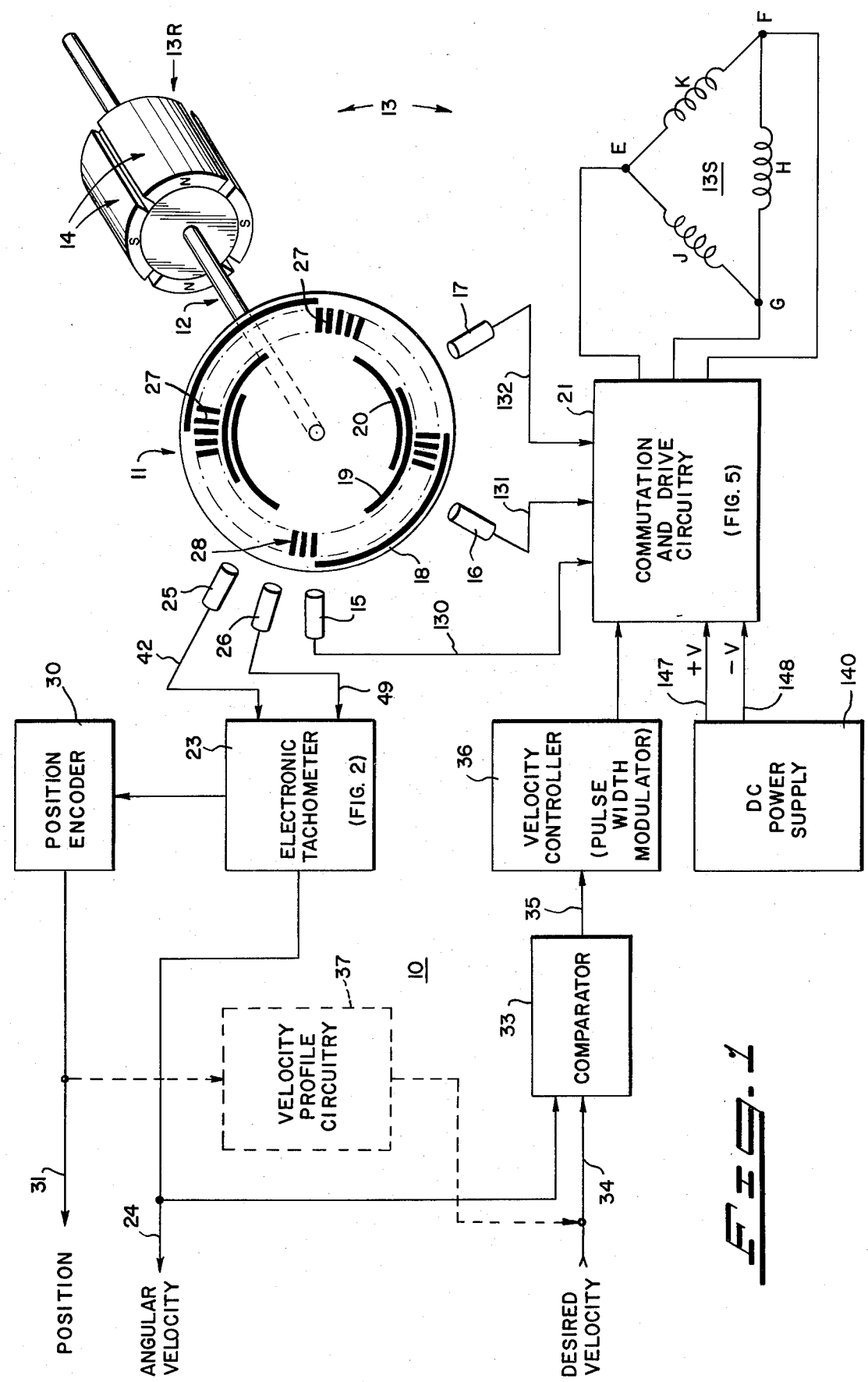
FIG. 1 illustrates a combined electronic tachometer, brushless dc motor commutator and position encoder system in accordance with the present invention. The drawing includes a perspective view, not to scale, of an optical encoder disc attached to the rotor shaft of a brushless dc motor, together with a block diagram of the associated system electronic components.

Referring to FIG. 1, there is shown a system 10 which performs the combined functions of electronic tachometer, brushless dc motor commutator and position encoder.

To this end, an optical encoder disc 11 is attached to the rotor shaft 12 of a brushless dc motor 13. Four rotor magnets 14 of alternate north (N) and south (S) polarity are mounted to the shaft 12 and comprise the rotor 13R of the motor 13. The angular orientation of the rotor magnets 14 is sensed by three optical sensors 15, 16, 17 which respectively detect sector-shaped indicia on three tracks 18, 19, 20 of the disc 11. The sensors 15–17 cooperate with appropriate commutation circuitry 21 to drive the stator windings 13S of the brushless motor 13. As described below in connection with FIGS. 5 through 7, the commutation circuitry 21 energizes the windings 13S in the appropriate sequence with respect to the orientation of the magnets 14 so as to achieve the desire rotation of the motor 13.

The angular velocity of the motor 13 is measured by an electronic tachometer 23, the details of which are described below in connection with FIGS. 2 and 3. The tachometer 23 produces on a line 24 an output signal having a magnitude that is directly proportional to the rotational speed of the motor shaft 12 and having a polarity indicative of the direction of such rotation.

To derive this velocity indicating output signal, the tachometer 23 utilizes a pair of optical sensors 25, 26 which produce triangular wave signals in response to detection of a plurality of equally spaced radial marks 27 arranged in an annular track 28 on the disc 11. The triangular wave signals produced by the sensors 25, 26 both have the same period, this period being directly proportional to the rotational speed of the shaft 12. The two triangular wave signals are offset in phase with respect to each other by a fixed angular amount. However, the direction of rotation of the shaft 12 will determine whether the triangular wave signal from the sensor 25 leads or lags the signal from the sensor 26. The tachometer electronic circuitry of FIG. 2 utilizes this period and relative phase relationship of the triangular wave signals to derive the velocity-indicating output on the line 24.

Since the marks 27 are equally spaced on the disc 11, each cycle of the triangular wave from either sensor 25 or 26 will indicate that the shaft has rotated through a corresponding fixed angle. By counting the number of such cycles, a signal can be obtained which indicates either the cumulative rotational angle of the shaft 12, or the distance travelled by a mechanical member driven by the shaft 12. A position encoder 30 accomplishes this operation and provides a position-indicating signal on a line 31. An illustrative embodiment of the position encoder 30 is described in connection with FIG. 8 below.

The tachometer and commutation functions may cooperate, as shown in FIG. 1, to provide a velocity servo system for the motor 13. To this end, a comparator 33 compares the actual velocity of the motor 13, as indicated by the signal on the line 24, with the desired velocity designated by an input signal supplied on a line 34. If these are different, an error signal is produced on a line 35. This is used by a velocity control circuit 36, typically a pulse width modulator, to modify the commutation operation of the circuitry 21. By appropriately pulse width modulating the drive signals to the windings 13S, the motor 13 can be sped up or slowed down until its actual velocity, as sensed by the tachometer 23, corresponds to the desired velocity.

In some applications, such as the paper feed mechanism in a high speed printer, the desired velocity may be a function of position. For such an application, the distance travelled by the paper between printing of each line will be indicated by the signal on the line 31 from the position encoder 30. Appropriate velocity profile circuitry 37 then may provide to the line 34 a signal which indicates the desired velocity as a function of position. For example, the circuitry 37 may comprise a memory storing different values of desired velocity, which are accessed in response to the position value indicated by the signal on the line 31. If stored in digital form, a digital-to-analog converter may be used to provide an analog signal on the line 34 indicative of the desired velocity. In a paper feed mechanism, the velocity profile may increase gradually with distance as the paper initially is accelerated, and may decrease smoothly or step-wise in velocity as the paper approaches the position at which the next line will be printed.

Electronic Tachometer

Operation of the electronic tachometer 23 may be understood in connection with FIGS. 1 through 4. As the encoder disc 11 rotates, a pair of triangular wave signals $V_1(\Theta)$ and $V_2(\Theta)$ (FIG. 3) are obtained on a respective pair of lines 40, 41 (FIG. 2) by amplifying the outputs from the optical sensors 25, 26.

To this end, the signal from the sensor 25 is supplied via a line 42 to an amplifier 43 consisting of an operational amplifier 44 the gain of which is established by a pair of feedback resistors 45, 46 and an input resistor 47 connected between the inverting (−) input and ground. The sensor signal is supplied to the non-inverting (+) input of the amplifier 44 across a resistor 48. Similarly, the signal from the sensor 26 is supplied via a line 49 and a resistor 50 to an amplifier 51 consisting of an operational amplifier 52 the gain of which is established by a feedback resistor 53 and an input resistor 54. The variable resistor 46 is used to adjust the gain of the amplifier 43 so that the peak amplitude A of the triangular wave signal 40' on the line 40 is equal to the peak amplitude of the signal 41' on the line 41, as illustrated in FIG. 3.

A plurality N of the radial marks 27 are equally spaced around the entire track 28 of the encoder disc 11 (FIGS. 1 and 4). In a typical embodiment there may be N=96 such radial marks, so that the angular distance between the leading edge of two consecutive marks 27 will be 3° 45' mechanical. With such arrangement, one complete cycle (360° electrical) the triangular waveshape $V_1(\Theta)$ or $V_2(\Theta)$ will correspond to 1/N revolution of the shaft 12, corresponding to 3° 45' mechanical.

Signals of triangular waveshape may be produced by using a mask 56 (FIG. 4) in conjunction with the track 28 of the encoder disc 11. The mask 56 may have a window 57 associated with the sensor 25 and a similar window, not shown, associated with the sensor 26. Advantageously, the window 57 is the same shape as the marks 27 and of which equal to the space therebetween. Thus as each mark 27 passes behind the window 57, the amount of light reflected to the sensor 25 will be proportional to the area of the window which is covered by the mark, and hence will be of triangular waveshape.

In the illustrated embodiment, the sensors 25 and 26 (and their associated windows in the mask 56, if used) are situated so that the respective triangular wave $V_1(\Theta)$ and $V_2(\Theta)$ are offset from one another by a fixed angular amount, herein illustrated as 90° electrical. With this arrangement, as the shaft 12 rotates counter-clockwise or forward, the signal $V_1(\Theta)$ will lag the signal $V_2(\Theta)$ by 90° electrical, whereas when the shaft rotates in clockwise direction (reverse) the signal $V_1(\Theta)$ will lead the signal $V_2(\Theta)$ by the same number of electrical degrees. This phase relationship will remain the same as the speed of rotation of the shaft 12 changes. Likewise, the maximum amplitude A will remain constant. However, the time duration of each electrical cycle of the waveshape $V_1(\Theta)$ and $V_2(\Theta)$ will change in direct proportion to the speed of rotation. This characteristic is utilized by the electronic tachometer circuitry of FIG. 2 to produce the velocity-indicating signal on the line 24.

Since the time duration for one cycle of the triangular wave signals varies with shaft 12 speed, the slope of each leg of the signals $V_1(\Theta)$ and $V_2(\Theta)$ likewise will vary in proportion to the rotational speed. Signals proportional to this slope are obtained by differentiating the triangular waves on the lines 40 and 41 in respective differentiator circuits 58 and 59. The differentiator 58 includes a capacitor 60 and a pair of resistors 61, 62 and the differentiator 59 includes a capacitor 63 and a pair of resistors 64, 65. The output signals 66', 67' on the respective lines 66, 67 correspond to the time derivatives $dV_1(\Theta)/dt$ and $dV_2(\Theta)/dt$ of the respective signals $V_1(\Theta)$ and $V_2(\Theta)$ as shown in FIG. 3. The amplitude B of the these time derivative signals 66', 67' is proportional to the slope of the signals $V_1(\Theta)$ and $V_2(\Theta)$ and hence is proportional to the speed of rotation of the shaft 12.

To obtain the velocity-indicating signal on the line 24, the time derivative signals 66', 67' are sampled by a set of sample signals 69' through 72' (FIG. 3) that are produced on a corresponding set of lines 70 through 72

Figure 2:
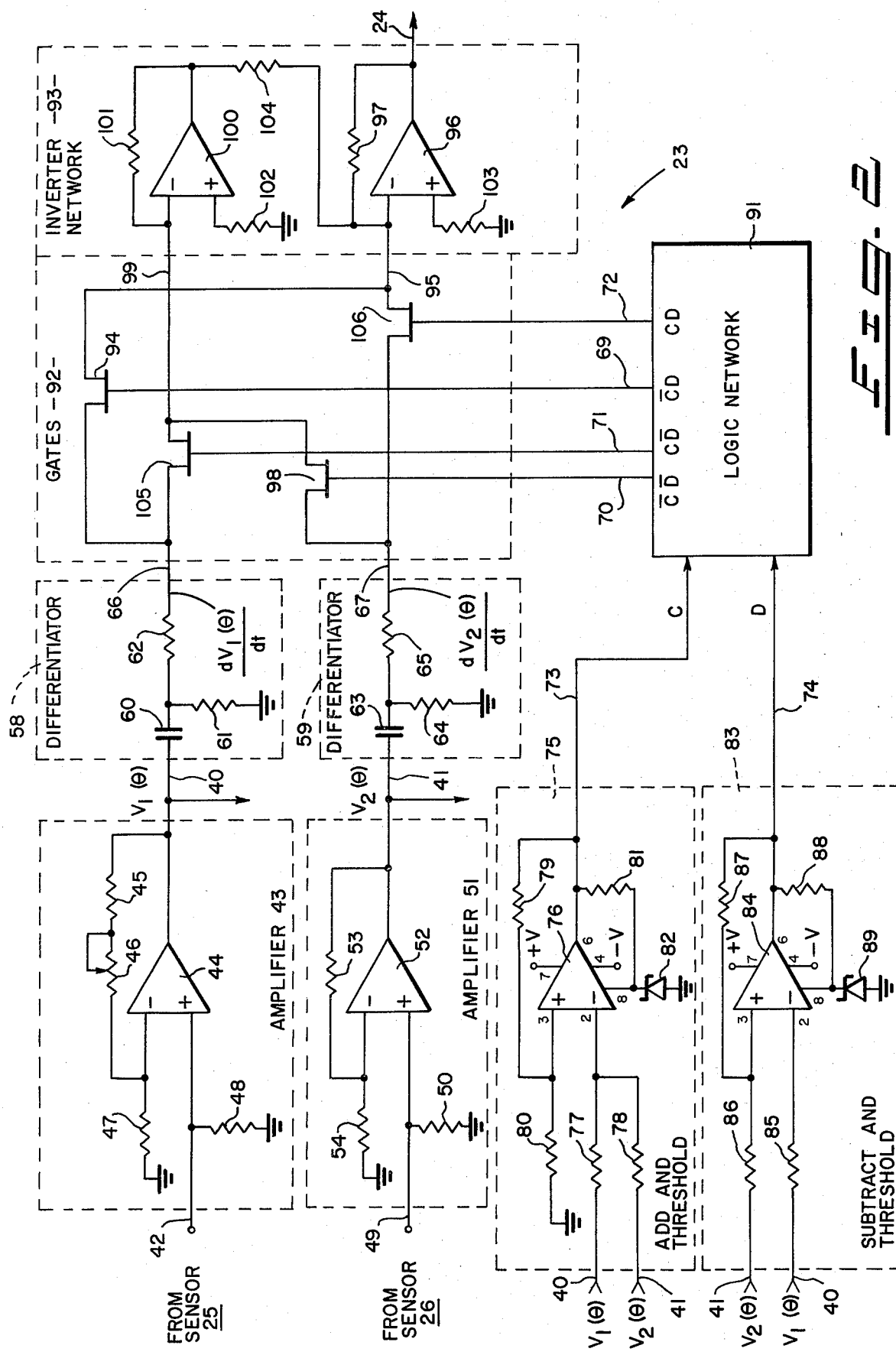
FIG. 2 is an electrical schematic diagram of an electronic tachometer which utilizes the optical encoder disc of FIG. 1, and which produces an output signal indicative of the angular velocity of the brushless motor shaft.

(FIG. 2). These sampling signals are derived from a pair of square waves C, D (FIG. 3) which are produced on a corresponding pair of lines 73, 74 by appropriate processing of the triangular wave signals $V_1(\Theta)$ and $V_2(\Theta)$. The square waves C and D each have the same period as the signals $V_1(\Theta)$ and $V_2(\Theta)$. The signals C and D are offset from each other by 90 electrical degrees and have transitions that occur 45 electrical degrees before or after the apices of the triangular waves $V_1(\Theta)$ and $V_2(\Theta)$ as illustrated in FIG. 3.

The square wave C is obtained in a circuit 75 by summing the triangular waves $V_1(\Theta)$ and $V_2(\Theta)$ in an operational amplifier 76 and thresholding the resultant signal at zero. This operation can be analogized to adding a cosine and a sine waveform each having the same period and maximum amplitude as the respective triangular waveforms $V_1(\Theta)$ and $V_2(\Theta)$. Thus if:

$$V_1 = A \cos N$$

$$V_2 = A \sin N$$

then:

$$V_1 + V_2 = A \cos N\theta + A \sin N\theta = A\sqrt{2} \cos (N\theta - \pi/4)$$

which is offset in phase from the initial (triangular) wave signals by 45 electrical degrees.

Addition of the triangular wave is accomplished by feeding the signals from the lines 40 and 41 via respective resistors 77, 78 to a summing point at the inverting (—) input of the amplifier 76. The gain of the amplifier 76 is set by a feedback resistor 79 and an input resistor 80 connected from the non-inverting (+) input to ground. Zero thresholding of the resultant sum signal is provided by connecting the output of the amplifier 76 to ground via a resistor 81 and a zener diode 82. This circuit will produce the square wave signal on the C on the line 73. The amplifier 76 may be implemented using a National Semiconductor type LM301 integrated circuit, the terminal connections of which are indicated by the small numerals next to the amplifier 76 in FIG. 2.

The square wave signal D is produced by subtracting the signal $V_2(\Theta)$ from $V_1(\Theta)$ and thresholding in a circuit 83. This is analogous to subtracting a cosine wave from a sine wave as given by the following equation.

$$V_1 - V_2 = A \cos N\theta - A \sin N\theta = A\sqrt{2} \sin (N\theta + \pi/4)$$

Note that the resultant signal is offset by 45 electrical degrees from the input triangular wave signals, but in the opposite sense from when addition is used.

To implement such subtraction and thresholding, the signals on the lines 40 and 41 are fed respectively to the inverting (—) and non-inverting (+) inputs of an operational amplifier 84 via respective resistors 85 and 86. A feedback resistor 87 establishes the circuit gain. Thresholding is accomplished by connecting the output terminal of the amplifier 84 to ground via a resistor 88 and a zener diode 89. The output signal D on the line 74 is as shown in FIG. 3.

The control signals 69' through 72' are obtained by logically combining the signals C and D in a logic network 91 which may comprise a type 7442 integrated circuit. The logical combination for each signal 69' through 72' are indicated in FIG. 3.

Each of the sampling signals 69'-72' occurs during the "center" of one or the other of the time derivative signals 66' and 67'. For example, during occurrence of the sampling signal 70', the time derivative signal 67' is of a constant positive value +B (for shaft rotation in the forward direction). The sampling signal 69' occurs when the time derivative signal 66' is at a constant negative value —B (for forward rotation). A set of gates 92 are enabled by these sampling signals 69'-72' to sample the time derivative signals and fed these via an inverter network 93 to the output line 24. This operation produces on the line 24 the velocity-indicating signal 24' illustrated at the bottom of FIG. 3. During occurrence of the sampling signal 69', a field effect transistor (FET) 94 is turned fully on so as to permit the signal 66' to be conducted from the line 66 via the FET 94 and a line 95 to the inverting (—) input terminal of an operational ampliifer 96 which is provided with a feedback resistor 97. The resultant output signal on the line 24 has an amplitude B corresponding to the amplitude of the signal 66' and a polarity opposite that of the signal 66' at the sample time, due to the polarity inversion through the amplifier 96. This results in the output signal section 24a shown in FIG. 3.

At the next sampling interval, the sampling signal 70' enables an FET 98 to feed the signal 67' from the line 67 via a line 99 to the inverting (—) input of an amplifier 100 having a feedback resistor 101. The (+) input of the amplifier 100 is connected to ground via resistor 102, and the (+) input of the amplifier 96 likewise is connected to ground via a resistor 103. The signal at the output of the amplifier 100 thus will have an amplitude B corresponding to the signal 67' but will be of opposite polarity. Hence when sampled by the sampling signal 70' (in the forward direction), the signal at the output of the amplifier 100 will have a value —B. This signal is fed via a resistor 104 to the inverting (—) input of the amplifier 96, wherein the signal again is inverted. As a result, there is produced on the line 24 the output signal portion 24b (FIG. 3) having the same positive polarity and ammplitude B as the immediately preceeding section 24a.

Similar sampling and single or double polarity inversion is accomplished during occurrence of the sampling signals 71' and 72', which respectively enable the FET's 105 and 106. The resultant output signal sections 24c and 24d also are of value +B.

Thus under the condition of forward rotation at a constant speed, the electronic tachometer 23 provides on the line 24 a signal having a positive polarity indicative of forward rotation and an amplitude B indicating the speed of rotation. Should this speed change, the amplitude B would change. This is illustrated on the left hand side of FIG. 3. Should the rotational speed decrease, the time to complete one revolution of the encoder disc 11 will decrease, so that the period of one electrical cycle of the triangular waves $V_1(\Theta)$ and $V_2(\Theta)$ will increase. Accordingly, the slope of the triangular waves 40' and 41' will decrease. As a result, the maximum amplitude of the time derivative signals 66' and 67' will decrease from the magnitude B shown in solid in FIG. 3 to the lesser magnitude B' indicated by the broken lines in FIG. 3. When sampled as described above, this will result in an output signal 24' having the lesser amplitude +B' also shown in broken lines in FIG. 3. That is, the lower rotational speed of the shaft 12 will be indicated by the lesser magnitude B of the velocity-indicating signal on the line 24.

The reversal of direction of the shaft 12 will be indicated by a change in polarity of the velocity-indicating signal on the line 24. This is indicated on the right hand side of FIG. 3. In the event of reverse rotation, the signal $V_1(\Theta)$ from the sensor 25 will lead the triangular wave $V_2(\Theta)$ from the sensor 26 by 90° electrical, instead of lagging it as in the forward direction.

In this instance, the polarity of the time derivative signals 66′ and 67′ will be reversed with respect to the forward direction. Thus, for example, during occurrence of the sampling pulse 69′, the time derivative waveform $dV_1(\Theta)/dt$ will have a positive polarity rather than a negative polarity as in the forward direction. This will result in the output signal section 24e (FIG. 3) which is of minus polarity. The same polarity inversion is true during the remaining sampling intervals. Thus, the electronic tachometer 23 provides on the line 24 an angular velocity-indicating signal having a polarity indicative of direction and a magnitude indicative of speed.

Any ripple produced by the tachometer 23 can be readily attenuated by filtering without reducing the system performance. Ripple may be produced by encoder non-linearity or by FET switching transients. Since the FET's 94, 98, 105, 106 are switched four times per encoded cycle, the ripple frequency $f_r$ is given by:

$$f_r = 4N \text{ (rotation rate)}$$

where N is the number of marks 27 on the encoder disc 11. Thus, for example, where N=96 and the maximum rotational rate of the shaft 12 is 1000 revolutions per minute (equal to 1000/60 revolutions per second), the ripple frequency is:

$$f_r = 4 \times 96 \times 1000/60 = 6.1 \text{ kHz}$$

By inserting a 1 kHz low-pass filter in the output from the amplifier 96 (FIG. 2), a very substantial ripple attenuation of approximately 20 db can be obtained without impairing the linearity of the output velocity-indicating signal on the line 24.

Position Encoder

An illustrative embodiment of the position encoder 38 is shown in FIG. 8. In this embodiment, a digital signal is provided on the line 31 which indicates the net angular rotation of the shaft 12 from an arbitrary starting point.

Position encoding is accomplished by recalling that the marks 27 are equally spaced around the encoder disc 11. Thus in the example given above, where there are N=96 marks on the disc 11, the passage of each mark 27 past either sensor 25 or 26 will indicate that the shaft 12 has rotated 3° 45′ mechanical. During angular rotation of this extent, four consecutive sampling pulses 69′ through 72′ (FIG. 3) will be generated at uniform intervals. Thus the beginning of each such sampling pulse will indicate a shaft 12 rotation of (3° 45′)/4 = 0.9375 mechanical degrees. This situation is utilized by the encoder circuit of FIG. 8.

To this end, the sampling pulses on the lines 69 through 72 each are differentiated by the respective RC networks 110–113 to produce on the respective lines 114–117 a set of positive impulses occurring at the leading edge of the respective sampling signals 69′–72′. These positive impulses are provided via an OR-gate 118 and a line 119 to the enable input of a gate 120. When enabled, the gate 120 passes a digital signal from a source 121 to an accumulator 122. The value of this signal advantageously corresponds to the number of degrees of rotation of the shaft 12 between occurrences of consecutive sampling pulses 69′–72′. In the example given, the digital signal from the source 121 would represent the value 0.9375°.

This value provided via the gate 120 is added to the previous contents of the accumulator 122, so that the result indicates the angular extent of rotation of the shaft 12.

For some purposes it is advantageous to reset the accumulator 122 to zero at some reference time or position. For example, in a paper feed mechanism it may be desirable to reset the accumulator 122 to zero each time that the motor 13 stops. In this way, the net contents of the accumulator 122 will indicate how far the paper has travelled since the last row was printed. In such embodiment, an appropriate accumulator reset circuit 123 may be provided. Also, the digital value provided by the source 121 may be given in terms of inches or millimeters of paper feed travel corresponding to the extent of shaft rotation between occurrences of consecutive sampling pulses. In such embodiment, the signal on the line 31 would indicate directly the extent of paper travel since the last line was printed. This distance may also be displayed on an appropriate numerical readout or other display 124.

In a paper feed system having two or more different spacings between typed lines, it is advantageous to have the number N of marks on the encoder disc 11 be divisible by both spacings, so that in integral number of triangular waves will be produced per complete line advance in both modes. Thus if both 6 and 8 lines per inch spacing are desired, N=96 marks is appropriate. If n revolutions of the motor 13 will advance the paper one inch, then exactly 96n/6 = 18n cycles of the triangular waveform (40′ or 41′) will be produced for each line advance in the 6 line per inch mode, and exactly 96n/8 = 12n cycles will result in the 8 line per inch mode. An integral number of pulses thus will be provided on the the gate enable line 119 (FIG. 8) of the position encoder 38 for both 6 lines/inch and 8 lines-/inch operation. This in turn will simplify the velocity profile circuitry 37, since integral units of position are produced in both modes. Also, the motor 13 will stop at a null position in both modes, aiding tachometer and commutation operation.

For applications in which the motor 13 may change direction, the net extent of travel still can be indicated by conditioning the accumulator 122 alternately to add or subtract depending on the direction of rotation of the shaft 12. To this end, the direction of rotation can be determined from the polarity of the angular velocity indicating signal on the line 24. An appropriate polarity detection circuit 125 may be used to determine if the signal on the line 24 is positive or negative. If positive, indicating forward rotation of the shaft 12, a signal is provided on the line 126 which conditions the accumulator 122 to add the value supplied via the gate 120 to the previous accumulator contents. If negative, indicating reverse rotation of the shaft 12, a signal is provided on the line 127 which conditions the accumulator 122 to subtract the value from the source 121 from the prior accumulator contents. As a result, the signal on the line 31 will indicate the net distance travelled.

For embodiments in which an angular value is given by the signal from the source 121, the accumulator 122 may be of modulo 360. In such instance the signal on the line 31 will indicate the net angular distance travelled from some arbitrary zero position, in values ranging from 0° to 360° mechanical.

Electronic Commutation

The encoder disc 11 includes sector tracks 18, 19 and 20 which are used in connection with the commutation and driver circuitry 21 to energize the stator windings 13S of the brushless motor 13. Illustrative circuitry to accomplish such commutation is shown in FIG. 5. Waveforms indicating the commutation sequence are shown in FIG. 6, and the waveforms of FIG. 7 illustrate the idealized torque as a function of position for a three phase, four pole motor.

Figure 6:
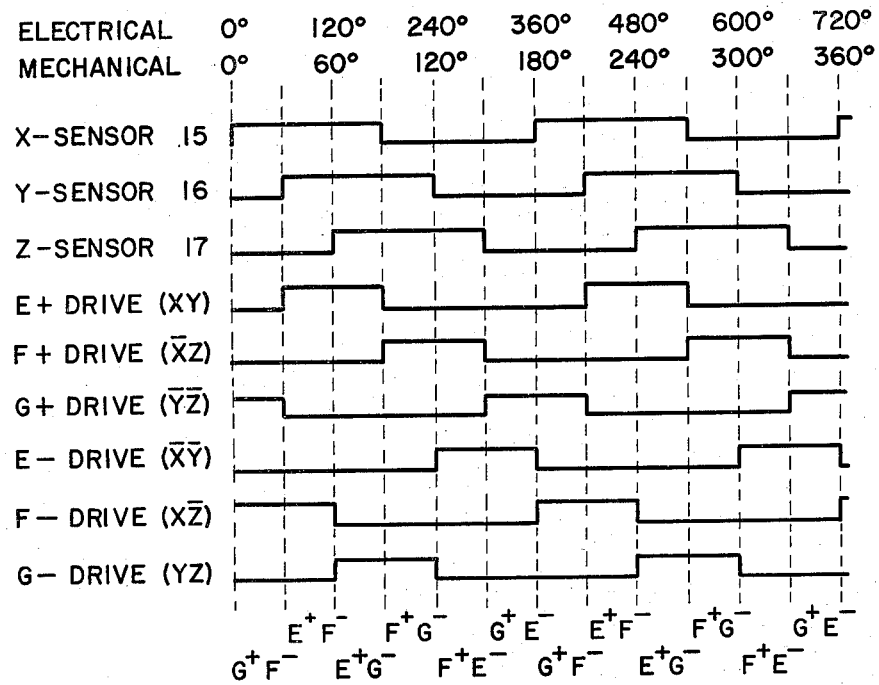
FIGS. 6 and 7 are timing diagrams illustrating the commutation sequence and torque as a function of position for the brushless dc motor operated by the commutator of FIG. 5.
Figure 7:
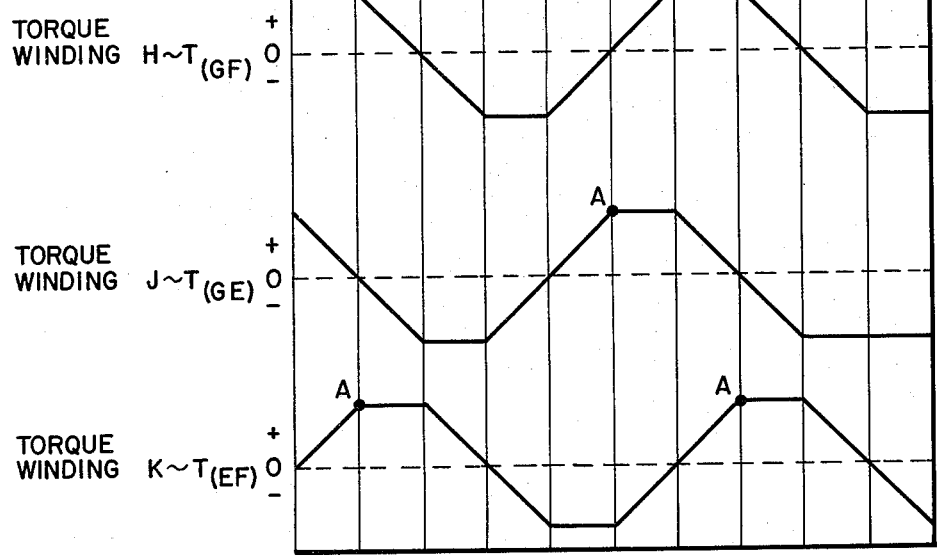

A logic network 133 (FIG. 5) is used to derive six drive signals respectively designated E+, F+, G+, E−, F− and G− having the respective logic combinations indicated in FIG. 6. For example, the drive signal E+ is the logical combination XY of the X and Y signals from the respective sensors 15 and 16.

These drive signals are used to turn on corresponding pairs of a set of transistors 134-139 so as to provide power from a dc supply 140 to the appropriate windings H, J and K of the brushless motor 13. The transistors 134-139 are shunted by respective diodes 141-146.

By way of example, during the initial phase of the commutation sequence, when the output X from the sensor 15 is high and the outputs Y and Z from the sensors 16 and 17 are low, drive signals G+ ($\overline{YZ}$) and F−(XZ) both are true. The drive signal G+ turns on the transistor 136 so as to connect the +V line 147 from the power supply 140 via the transistor 136 to the winding terminal G. The drive signal F− turns on the transistor 138 so as to connect the −V terminal of the power supply 140 via a line 148 and the transistor 138 to the winding terminal F. As a result, current will flow from the terminal G (at positive potential) through the winding H to the terminal F (at negative potential). As a result, the magnetic field from the winding H will interact with the rotor magnets 14 so as to impart a torque thereto. During successive cycles of the commutation sequence, other pairs of the transistors 134-139 will be turned on so as to energize the windings H, J and K in an appropriate sequence so as to obtain maximum torque for the brushless motor 13. The specific commutation sequence is shown by the diagrams of FIGS. 6 and 7.

The velocity controller 36 (FIG. 1) advantageously comprises a pulse width modulator that cooperates with the commutation and driver circuitry of FIG. 5. In a simple embodiment (not shown) instead of applying a dc voltage to the terminals 147 and 148, a rectangular wave signal is applied which has a variable duty cycle. The greater the duty cycle (i.e., the higher the ratio of ON time to OFF time), the greater will be the velocity of the brushless motor 13 up to a maximum when the duty cycle is 100% (i.e., when dc is applied). The error signal on the line 35 from the comparator 33 then may be used to control the duty cycle of the rectangular wave, in a manner known per se. Velocity control thereby is achieved.

We claim:

1. A combined electronic tachometer and position determining system for producing a first signal indicative of the rotational velocity of a motor and a second signal indicative of total angular rotation of said motor, comprising:

transducer means, attached to said motor, for producing first and second triangular wave signals of the same period but offset in phase with respect to each other by a fixed angular amount, said same period being directly proportional to the rotational velocity of said motor, said transducer means including:
an optically encoded disc driven by the shaft of said motor and containing a plurality of equally angularly spaced sector marks, and
first and second optical sensors arranged with a fixed angular offset therebetween, each sensor detecting the passage of said sector marks so that the outputs of said optical sensors comprise said first and second triangular wave signals, first and second differentiators connected to differentiate respectively said first and second triangular wave signals and to produce corresponding first and second differentiator output signals indicative respectively of the first time derivative of said first and second triangular wave signals, gating control means for deriving from said first and second triangular wave signals a set of time sequential sample signals for sampling said differentiator output signals respectively during the intervals between occurrence of the corresponding triangular wave peaks, sampling means, actuated by said sample signals, for alternatively sequentially sampling both said first and second differentiator output signals and for providing the resultant sampled outputs to a common line as said velocity indicative signal, an accumulator, and position increment means, responsive to occurrence of each of said sample signals, for providing to said accumulator a value indicative of the extent of positional change of said encoded disc required to produce each sample signal, the resultant accumulated contents of said accumulator representing total angular rotation of said motor shaft.

2. A system according to claim 1 wherein said motor is used to drive the paper feed mechanism of a printer, said feed mechanism having at least two different spacings corresponding respectively to A and B printed lines per unit of distance, and wherein said encoder disc has a total number N of radially spaced sector marks, said number N being divisible by both said spacing values A and B, whereby an integral number of triangular waveform signals and hence an integral number of sample signals are produced as said paper is fed to the next print line position by said mechanism, regardless of which between-line spacing is employed.

3. A system according to claim 2 together with:
means for clearing said accumulator before the start of each paper feed operation, and
means for stopping said motor and thereby terminating the driving of said feed mechanism when the contents of said accumulator reaches a preset value.

4. A system according to claim 3 further comprising:
means for cooperatively utilizing said velocity indicative signal and the contents of said accumulator to control the speed of said motor during the driving of said feed mechanism.

5. A system according to claim 1 wherein:
said motor is used to drive an incremented feed mechanism, said feed mechanism having a first operational mode in which an article is fed A units of distance per movement and a second operational mode in which an article is fed B units of distance per movement,
said encoder disc having a total number N of radially separated sector marks, said number N being divisible by both values A and B, whereby an integral number of triangular waveform signals and hence an integral number of sample signals are produced as said article is fed by said mechanism either A or B units of distance, said accumulator being cleared before each feed operation of said mechanism, said motor being stopped to terminate each feed operation when the contents of said accumulator reaches a certain value, said motor thereby always stopping with said triangular waveform at an apex position, whereby stable operation is achieved in both said first and second operational modes.

* * * * *